(12) United States Patent
Liu et al.

(10) Patent No.: US 12,546,441 B2
(45) Date of Patent: Feb. 10, 2026

(54) FAN GEARBOX OIL REPLACEMENT DEVICE AND METHOD FOR USING THE SAME

(71) Applicant: Huaneng Jiuquan Wind Power Co., Ltd, Gansu (CN)

(72) Inventors: Haibin Liu, Gansu (CN); Manyuan Yu, Gansu (CN); Bo Wang, Gansu (CN); Chengjin Shi, Gansu (CN); Yanlong Zhao, Gansu (CN)

(73) Assignee: Huaneng Jiuquan Wind Power Co., Ltd, Gansu (CN)

( * ) Notice: Subject to any disclaimer, the term of this patent is extended or adjusted under 35 U.S.C. 154(b) by 0 days.

(21) Appl. No.: 18/033,792

(22) PCT Filed: Aug. 15, 2022

(86) PCT No.: PCT/CN2022/112368
§ 371 (c)(1),
(2) Date: Apr. 25, 2023

(87) PCT Pub. No.: WO2023/173672
PCT Pub. Date: Sep. 21, 2023

(65) Prior Publication Data
US 2024/0384836 A1    Nov. 21, 2024

(30) Foreign Application Priority Data
Mar. 14, 2022  (CN) .......................... 202210248632.4

(51) Int. Cl.
*F16N 39/06*   (2006.01)
*B01D 36/04*   (2006.01)
*F16N 33/00*   (2006.01)

(52) U.S. Cl.
CPC ............. *F16N 39/06* (2013.01); *B01D 36/04* (2013.01); *F16N 33/00* (2013.01)

(58) Field of Classification Search
USPC .......................................................... 210/806
See application file for complete search history.

(56) References Cited

U.S. PATENT DOCUMENTS 5,676,840 A * 10/1997 Paul ................... B01D 21/2427
                                                          210/695

FOREIGN PATENT DOCUMENTS

| CN | 105804949 B | * | 6/2019 | ............ F03D 3/062 |
| CN | 209818225 U | * | 12/2019 | ............ F03D 80/70 |

(Continued)

*Primary Examiner* — Vickie Y Kim (57) ABSTRACT

A fan gearbox oil replacement device and a method for using the same; the fan gearbox oil replacement device in includes a moving box body, a reversing mechanism, a filtering mechanism and an oil storage mechanism are arranged in the moving box body; the reversing mechanism is provided with an oil inlet and an oil outlet which are opened or closed at different time; the filtering mechanism comprises a filtering tank and a sedimentation tank, the filtering tank is located below the oil outlet, and the sedimentation tank is located below the filtering tank; the sedimentation tank is connected to the oil storage mechanism and is communicated with the interior of the filtering tank; the oil storage mechanism is communicated with the oil inlet; the sedimentation tank and the oil storage tank of the present invention can be easily pushed into or pushed out from the moving box body.

8 Claims, 6 Drawing Sheets

(56) References Cited

FOREIGN PATENT DOCUMENTS

| | | | | | |
|---|---|---|---|---|---|
| CN | 111577422 | A | * | 8/2020 | ............. F01M 11/03 |
| CN | 114893355 | A | * | 8/2022 | ............. F03D 80/00 |
| CN | 117927644 | A | * | 4/2024 | ................ H02J 7/35 |
| JP | 2010236596 | A | * | 10/2010 | |

* cited by examiner

FAN GEARBOX OIL REPLACEMENT DEVICE AND METHOD FOR USING THE SAME

TECHNICAL FIELD

This invention generally relates to the technical field of oil replacement devices, and more particularly, to a fan gearbox oil replacement device and a method for using the same.

BACKGROUND

In wind power generation, a fan gearbox is arranged in an engine room, and gears are arranged in the gearbox. To ensure the reliability and stability of the fan operation, it is necessary to lubricate the gears during the operation. The oil for lubricating the gears stays in the gearbox. Due to the limited functional life, the gear oil in the fan gearbox needs to be replaced after a certain period of fan operation. When replacing the gear oil in the fan gearbox, the replacement is normally performed manually. The waste oil in the gearbox is manually discharged into a waste oil drum and then transported to other places using a lifting device. The fresh oil for replacement is transported into the engine room using the lifting device and manually fed into the gearbox. However, in the prior art, most of the replaced gear oil is wasted, resulting in difficult recycle and reuse of the waste oil. Additionally, it is not convenient to clean the fan gearbox, leading to incomplete oil replacement and failure of preventing impurities from affecting its operation.

SUMMARY

The purpose of the present invention is to provide a fan gearbox oil replacement device and a method for using the same.

To achieve the above purpose, the present invention adopts the following technical solution: a fan gearbox oil replacement device comprising a moving box body, wherein a reversing mechanism, a filtering mechanism and an oil storage mechanism are arranged in the moving box body, wherein the reversing mechanism is provided with an oil inlet and an oil outlet which are not opened or closed at the same time, wherein the filtering mechanism comprises a filtering tank and a sedimentation tank, wherein the filtering tank is located below the oil outlet, and the sedimentation tank is located below the filtering tank, wherein the sedimentation tank is connected to the oil storage mechanism and is communicated with the interior of the filtering tank, wherein the sedimentation tank is capable of being pushed into or pushed out from the moving box body, the oil storage mechanism is capable of being pushed into or pushed out from the moving box body, and the oil storage mechanism is communicated with the oil inlet.

In another preferred embodiment of the present invention, a fixing frame is fixedly connected to the bottom of the interior of the moving box body, and a limiting sliding rod is connected between the fixing frame and the inner wall of the moving box body, wherein a driving lead screw is rotatably connected between the fixing frame and the inner wall of the moving box body while located below the limiting sliding rod, wherein a second motor is fixedly connected to one side of the moving box body, and an output end of the second motor is connected to the driving lead screw, wherein the outer side of the driving lead screw is in threaded connection with a driving sliding block, the driving sliding block is slidably connected to the limiting sliding rod, and the top of the driving sliding block is connected to the sedimentation tank, wherein the second motor propels the driving lead screw to rotate such that the driving lead screw propels the driving sliding block to move towards the second motor, and then the driving sliding block pushes the sedimentation tank leftwards out from the interior of the moving box body, wherein a pulley is mounted on one side of the inner wall of the moving box body, and a bottom end of a driving sliding block is connected to one end of a steel wire rope, wherein the other end of the steel wire rope passes through the pulley and is connected to the oil storage mechanism, and a second reset spring is sleeved on the outer side of the steel wire rope and located between the oil storage mechanism and a fixing frame, wherein under the action of the second reset spring, the oil storage mechanism is pushed out from the moving box body.

In another preferred embodiment of the present invention, the oil storage mechanism is an oil storage tank, wherein the oil storage tank is slidably connected to the interior of the moving box body, and an oil suction pipe communicating with the oil inlet is arranged in the oil storage tank, wherein the second reset spring is arranged in the moving box body and located above the oil storage tank, and a limiting clamping plate is fixedly connected to the bottom of the second reset spring, wherein a driven gear is rotatably connected to the interior of the limiting clamping plate, a third motor is fixedly connected to the top of the second reset spring, and a driving gear is fixedly connected to an output end of the third motor, wherein the driving gear is engaged with the driven gear, and the bottom of the driven gear is fixedly connected to a cleaning brush, wherein the cleaning brush is located inside the oil storage tank and outside the oil suction pipe, wherein the driving gear propels the cleaning brush to rotate through the driven gear, and the cleaning brush cleans the outer side of the oil suction pipe, thereby preventing impurities from blocking the filtering holes in the outer side of the bottom of the oil suction pipe.

In another preferred embodiment of the present invention, the reversing mechanism is arranged at the top of the interior of the moving box body, wherein the reversing mechanism comprises an adjusting groove, a first piston, a connecting rod and a second piston, wherein the top of the inner wall of the moving box body is fixedly connected to the adjusting groove, and the interior of the adjusting groove is slidably connected to the first piston and the second piston, wherein the first piston and the second piston are connected through the connecting rod, one end of the adjusting groove is connected to an electric telescopic rod, and the output end of the electric telescopic rod is connected to the second piston, wherein an oil outlet is formed in the bottom of the adjusting groove and is located below the first piston, and an oil inlet is formed in the bottom of the adjusting groove and is located below the second piston, wherein a sewage pump and a high-pressure oil pump are fixedly connected to the interior of the moving box body and are located below the adjusting groove, wherein the filtering tank is mounted inside the moving box body 1 and is located below the sewage pump.

In another preferred embodiment of the present invention, the top of the filtering tank is provided with an inlet, and the oil outlet is arranged above the inlet, wherein the bottom portion of the filtering tank is provided with filtering holes, one end of the filtering tank is clamped with an anti-leakage cover plate, and the other end of the filtering tank is provided with a limiting slot hole, wherein one side of the anti-leakage cover plate is provided with a limiting pin for interacting with the limiting slot hole, and the top and the bottom of the anti-leakage cover plate are both provided with retraction grooves, wherein a first reset spring is arranged inside the retraction groove, a limiting clamping block is arranged at the top of the first reset spring, and a limiting clamping groove for interacting with the limiting clamping block is formed in the inner wall of the filtering tank, wherein the top of the limiting clamping block is configured to be an inclined surface structure, allowing the anti-leakage cover plate to be quickly clamped and fixed.

In another preferred embodiment of the present invention, a filtering basin is mounted at the top of the sedimentation tank, the first motor is arranged at the bottom of the filtering basin, and an output end of the first motor is connected to an anti-blocking plate, wherein the bottom of the anti-blocking plate is slidably connected to the filtering basin, the bottom of the sedimentation tank is provided with an inclined groove, and a permanent magnet is mounted in the inclined groove.

In another preferred embodiment of the present invention, a winding frame is arranged at the top of the moving box body, a connecting oil pipe is wound at the middle portion of the winding frame, and the connecting oil pipe is communicated with the interior of the adjusting groove through a rotating joint.

A method for using the fan gearbox oil replacement device, comprising:

Step 1: during the gearbox oil replacement, connecting one end of the connecting oil pipe to an oil discharge port of the fan gearbox first, then making the electric telescopic rod to extend to push the second piston and the first piston to the left side, thereby enabling the second piston to block the oil inlet while allowing the first piston and the oil outlet to be staggered; at this point, pumping the waste oil in the fan gearbox out and discharging the waste oil into the filtering tank by the sewage pump, thereby allowing the waste oil to enter the filtering basin and the sedimentation tank after being filtered by the filtering tank; after the waste oil enters the filtering basin, propelling the anti-blocking plate to rotate by the first motor, thus preventing the dirt in the waste oil from blocking the filtering basin; after the waste oil filtered by the filtering basin enters the sedimentation tank, enabling iron impurities in the waste oil to be attached at the bottom of the sedimentation tank under the action of the permanent magnet; after the sedimentation, when the waste oil in the oil storage tank is discharged, propelling the driving gear to rotate by the third motor such that the driving gear propels the cleaning brush to rotate through the driven gear, which enables the cleaning brush to slowly clean the outer side of the oil suction pipe to prevent the impurities from blocking the filtering holes in the outer side of the oil suction pipe;

When the filtered impurities need to be cleaned, pulling out the filtering tank from the moving box body, and moving the limiting clamping block to press the first reset spring, and when the limiting clamping block retracts into the retraction groove, pulling out the anti-leakage cover plate from one side, and pouring the impurities in the filtering tank out; simultaneously propelling the driving lead screw to rotate through the second motor, thus making the driving lead screw propel the driving sliding block to move to the second motor, so that the driving sliding block pushes the sedimentation tank leftwards out from the interior of the mobile box body; subsequently, removing the permanent magnet, cleaning the impurities off the sedimentation tank, and when the driving sliding block approaches one side of the second motor, pushing the oil storage tank out from the moving box body by the second reset spring, thereby cleaning impurities off the oil storage tank;

Step 2: after the waste oil in the fan gear box is completely discharged, connecting one end of the connecting oil pipe to a high-pressure spray head, and aligning the high-pressure spray head with the fan gearbox; pulling the second piston and the first piston towards the other side through the retraction of the electric telescopic rod, thereby enabling the connecting rod to block the oil outlet while allowing the second piston and the oil inlet to be staggered; subsequently, pumping the filtered waste oil into the fan gearbox by means of the high-pressure oil pump, cleaning the fan gearbox by means of high-pressure oil, feeding fresh oil into the oil storage tank after the cleaning, and then feeding the fresh oil into the fan gearbox by means of the high-pressure oil pump.

Compared with the prior art, the present invention has the following advantages:

The present invention provides a fan gearbox oil replacement device and a method for using the same; by means of the adjusting groove, the opening and closing of the oil inlet and oil outlet can be flexibly controlled, enabling the oil inlet and oil outlet to be opened or closed at different time; the waste oil can be recycled, achieving a thorough utilization of the replaced waste oil; through arranging the filtering mechanism, the waste oil is sedimented in the sedimentation tank after being filtered by the filtering tank and the filtering basin, and the iron impurities are attached to the bottom of the sedimentation tank under the action of the permanent magnet, achieving a convenient recycle; through the driving screw rod and the fixing frame, the sedimentation tank and the oil storage tank can be easily pushed into or pushed out from the moving box body, allowing the impurities to be cleaned off conveniently; moreover, by providing the high-pressure oil pump, the filtered oil can be discharged into the fan gearbox for cleaning, achieving a thorough replacement of oil while preventing the impurities from affecting its operation.

In the Figures: 1—Moving Box Body, 2—Adjusting Groove, 3—The First Piston, 4—Connecting Rod, 2—The Second Piston, 6—Electric Telescopic Rod, 7—Sewage Pump, 8—High-pressure Oil Pump, 9—Filtering Tank, 10—Anti-leakage Cover Plate, 11—Limiting Slot Hole, 12—Limiting Clamping Groove, 13—Retraction Groove, 14—The First Reset Spring, 15—Limiting Clamping Block, 16—Sedimentation Tank, 17—Filtering Basin, 18—The First Motor, 19—Anti-blocking Plate, 20—Inclined Groove, 21—Permanent Magnet, 22—Fixing Frame, 23—Limiting Sliding Rod, 24—Driving Lead Screw, 25—The Second Motor, 26—Driving Sliding Block, 27—Pulley, 28—Steel Wire Rope, 29—Oil Storage Tank, 30—The Second Reset Spring, 31—The Third Motor, 32—Driving Gear, 33—Limiting Clamping Plate, 34—Driven Gear, 35—Oil Suction Pipe, 36—Cleaning Brush, 37—Winding Frame, 38—Connecting Oil Pipe.

DETAILED DESCRIPTION

The present invention is described in detail below, which allows the benefits and features of the present invention to be easily understood by those skilled in the art, thereby clearly defining the scope of the present invention.

A brief description on one or more aspects is presented below to achieve a basic understanding of the present invention. This description is not a comprehensive overview on all aspects, and is not intended to identify the key or decisive elements of all aspects, nor is it an attempt to define the scope of any or all aspects. Its sole purpose is to provide some concepts of one or more aspects hereinafter in a simplified form for achieving a detailed description.

In the description of the present invention, the terms "inside", "outside", "vertical", "horizontal", "up", "down", "top", "bottom", "coaxial", "one end", "other end", "front", "rear" and "both ends" are used to indicate the orientation or position relationship based on that shown in the drawings, which allow the present invention to be conveniently described but do not mean that the present invention is constructed and operated in a specific orientation. Therefore, these terms should not be understood as limitations of the present invention.

In the description of the present invention, unless it is clearly stated, the terms "mounted", "arranged", "connected", "fixed" and "rotationally connected" shall be understood in a broad sense. For instance, it may be a fixed connection, a detachable connection, a mechanical connection, an electrical connection, a direct connection, an indirect connection through an intermediate medium, an internal connection of two components or an interaction between two components. For those skilled in the art, the specific meanings of the above terms in the present invention may be understood according to specific circumstances.

As shown in FIGS. 1-8, the fan gearbox oil replacement device comprises a moving box body 1, a reversing mechanism and a filtering mechanism, wherein the reversing mechanism is arranged at the top of the interior of the moving box body 1. The reversing mechanism comprises an adjusting groove 2, a first piston 3, a connecting rod 4 and a second piston 5, wherein the top of the inner wall of the moving box body 1 is fixedly connected to the adjusting groove 2, and the interior of the adjusting groove 2 is slidably connected to the first piston 3 and the second piston 5. The first piston 3 and the second piston 5 are connected through the connecting rod 4, one end of the adjusting groove 2 is connected to an electric telescopic rod 6, and the output end of the electric telescopic rod 6 is connected to the second piston 5. An oil outlet is formed in the bottom of the adjusting groove 2 and is located below the first piston 3, and an oil inlet is formed in the bottom of the adjusting groove 2 and is located below the second piston 5. A sewage pump 7 and a high-pressure oil pump 8 are fixedly connected to the interior of the moving box body 1 and are located below the adjusting groove 2. An input end of the sewage pump 7 is connected to the oil outlet, and an output end of the high-pressure oil pump 8 is connected to the oil inlet, which allow the waste oil to be conveniently filtered and the inner wall of the gearbox easily cleaned. The filtering mechanism comprises a filtering tank 9, a sedimentation tank 16, a filtering basin 17 and a permanent magnet 21. The filtering tank 9 is mounted inside the moving box body 1 and is located below the sewage pump 7, the sedimentation tank 16 is capable of being pushed into the moving box body 1 or pushed out from the moving box body 1, and an oil storage tank 29 is capable of being pushed into or pushed out from the moving box body 1, thereby facilitating the removal of impurities.

Figure 1:
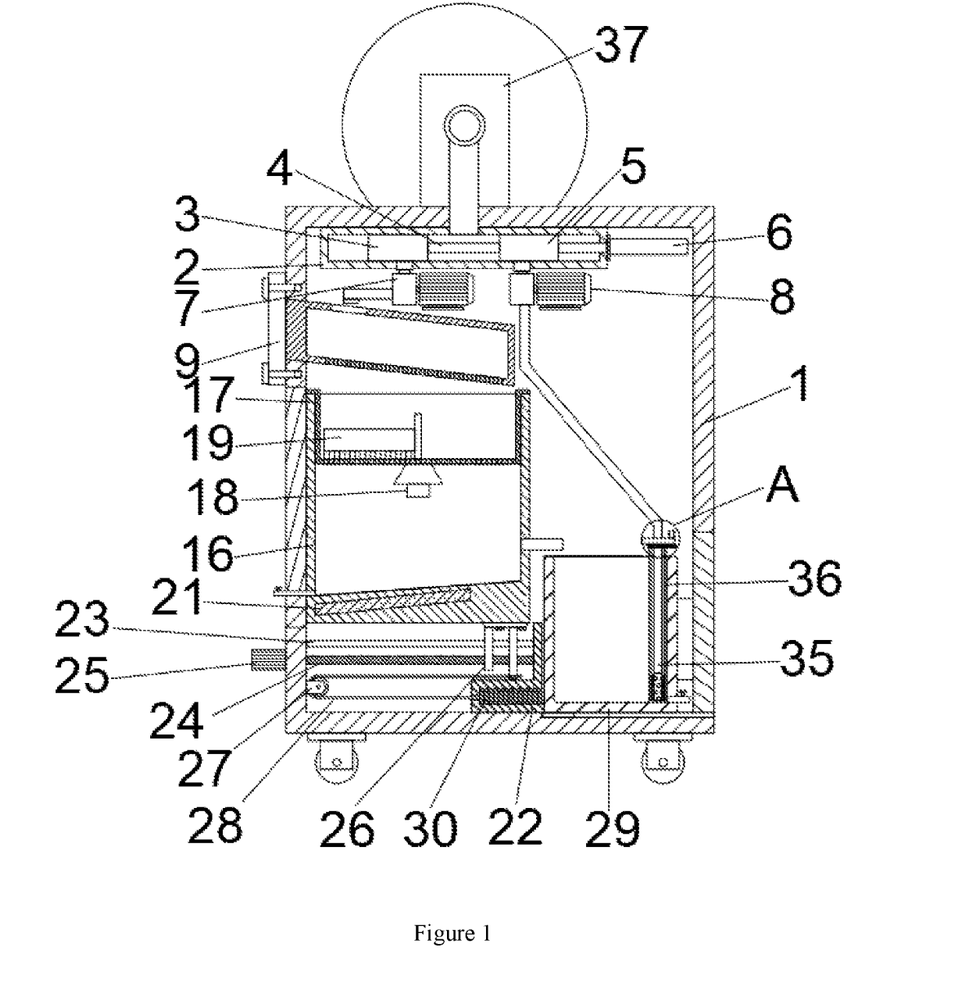
FIG. 1 is a schematic diagram illustrating a sectional view of the present invention.
Figure 7:
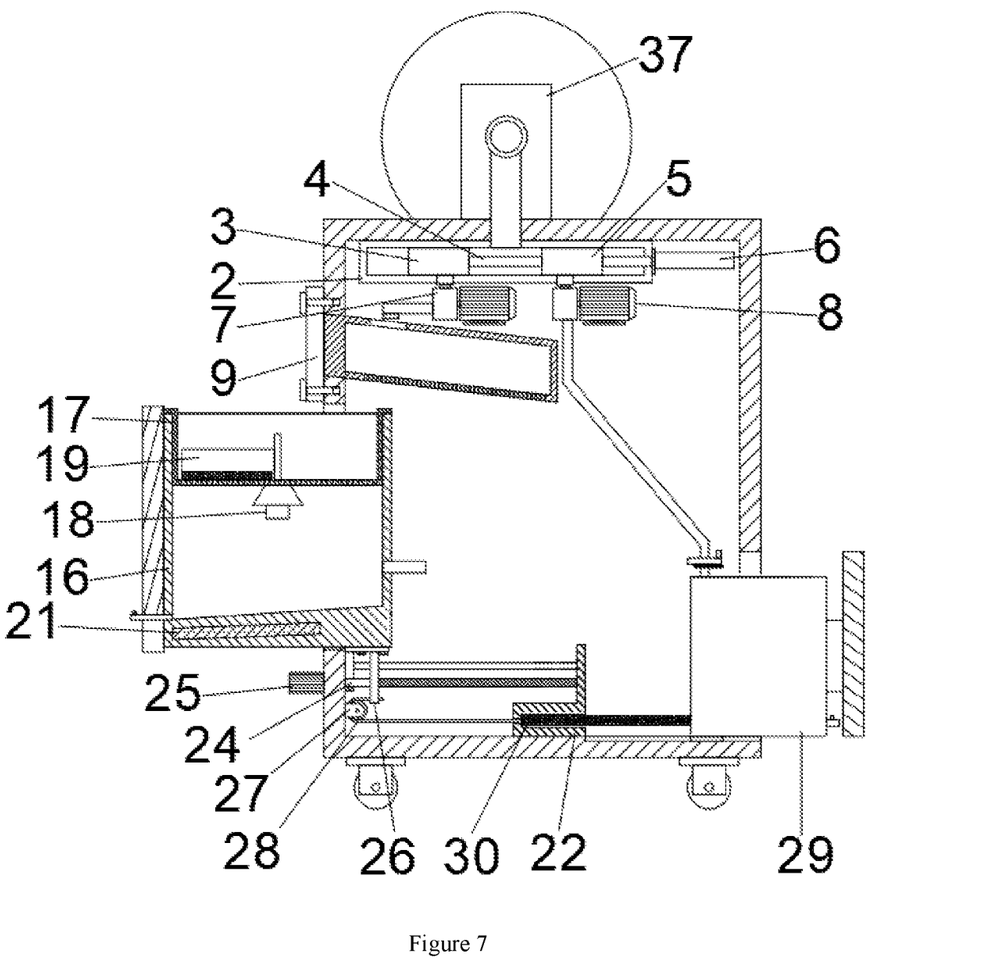
FIG. 7 is a schematic diagram illustrating an exemplary structure when the sedimentation tank and the oil storage tank of the present invention are pushed out.

In a preferred embodiment of the present invention, a fixing frame 22 is fixedly connected to the bottom of the interior of the moving box body 1, and a limiting sliding rod 23 is connected between the fixing frame 22 and the inner wall of the moving box body 1. A driving lead screw 24 is rotatably connected between the fixing frame 22 and the inner wall of the moving box body 1 while located below the limiting sliding rod 23. A second motor 25 is fixedly connected to one side of the moving box body 1, and an output end of the second motor 25 is connected to the driving lead screw 24. The outer side of the driving lead screw 24 is in threaded connection with a driving sliding block 26, the driving sliding block 26 is slidably connected to the limiting sliding rod 23, and the top of the driving sliding block 26 is connected to the sedimentation tank 16. The second motor 25 propels the driving lead screw 24 to rotate such that the driving lead screw 24 propels the driving sliding block 26 to move towards the second motor 25, and then the driving sliding block 26 pushes the sedimentation tank 16 leftwards out from the interior of the moving box body 1. Contrarily, the sedimentation tank 16 is pushed into the moving box body 1.

Figure 3:
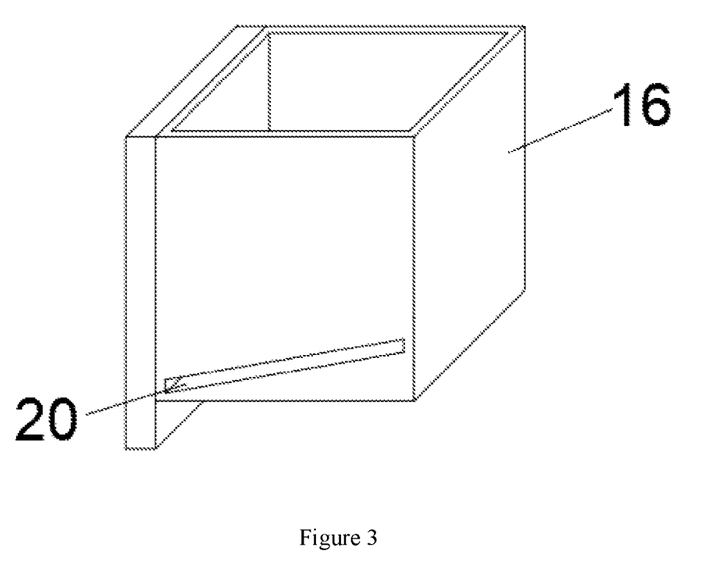
FIG. 3 is a schematic diagram illustrating an exemplary structure of the sedimentation tank of the present invention.

An oil storage tank 29 is slidably connected to the interior of the moving box body 1, and an input end of the high-pressure oil pump 8 is connected to an oil suction pipe 35. The filtering basin 17 is mounted at the top of the sedimentation tank 16, the first motor 18 is arranged at the bottom of the filtering basin 17, and an output end of the first motor 18 is connected to an anti-blocking plate 19. The bottom of the anti-blocking plate 19 is slidably connected to the filtering basin 17, the bottom of the sedimentation tank 16 is provided with an inclined groove 20, and the permanent magnet 21 is mounted in the inclined groove 20. In this way, the iron impurities in the waste oil are easily attached to the bottom of the sedimentation tank 16, thereby effectively accelerating the speed of sedimentation.

A pulley 27 is mounted on one side of the inner wall of the moving box body 1, and a bottom end of the driving sliding block 26 is connected to one end of a steel wire rope 28. The other end of the steel wire rope 28 passes through the pulley 27 and is connected to the oil storage tank 29, and a second reset spring 30 is sleeved on the outer side of the steel wire rope 28 and located between the oil storage tank 29 and the fixing frame 22. When the driving sliding block 26 approaches one side of the second motor 25, the sedimentation tank 16 is pushed out from the moving box body 1. At this point, under the action of the second reset spring 30, the oil storage tank 29 is pushed rightwards out from the moving box body 1. Contrarily, the oil storage tank 29 is pushed into the moving box body 1.

Figure 4:
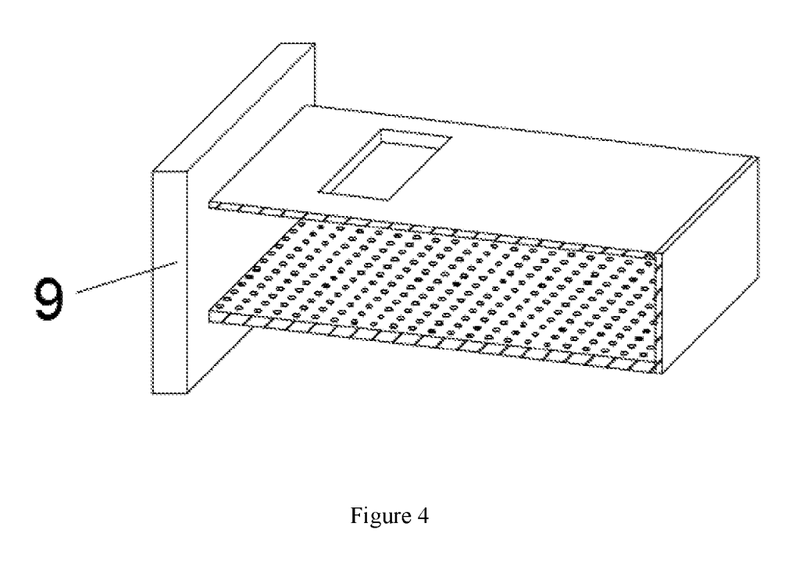
FIG. 4 is a schematic diagram illustrating an internal structure of the filtering tank of the present invention.
Figure 5:
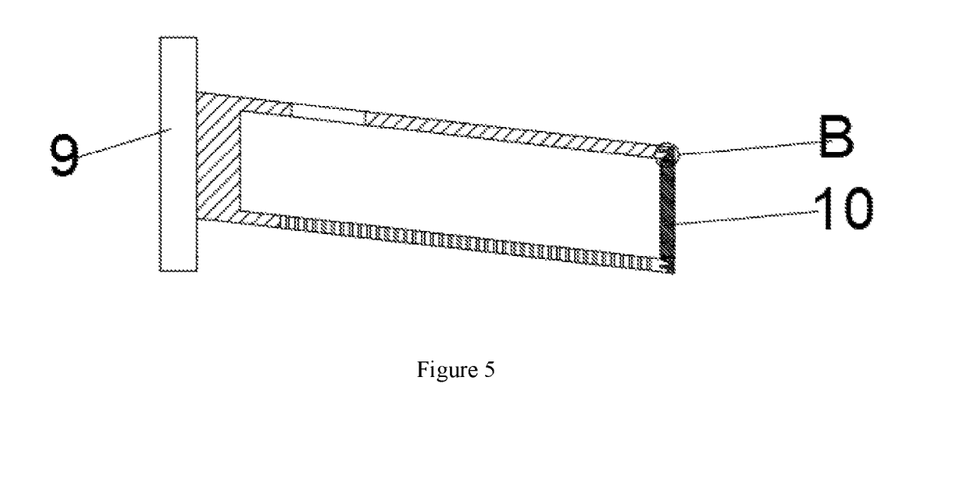
FIG. 5 is a schematic diagram illustrating a sectional structure of the filtering tank of the present invention.
Figure 6:
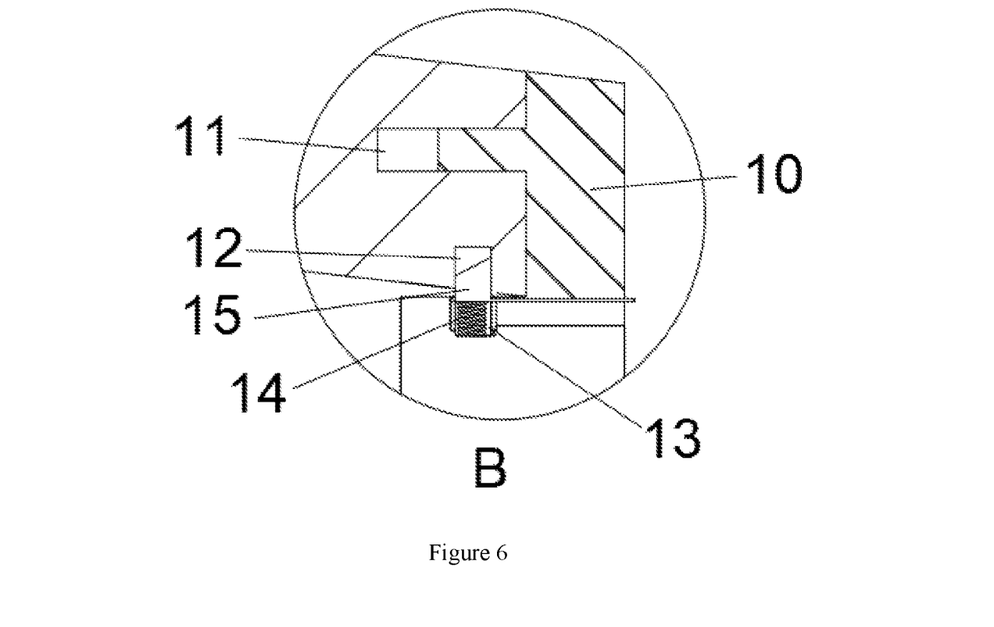
FIG. 6 is a schematic diagram illustrating an enlarged view of portion B in FIG. 5 of the present invention.

The top of the filtering tank 9 is provided with an inlet, and the output end of the sewage pump 7 is located above the inlet. The bottom portion of the filtering tank 9 is provided with filtering holes, one end of the filtering tank 9 is clamped with an anti-leakage cover plate 10, and the other end of the filtering tank 9 is provided with a limiting slot hole 11. One side of the anti-leakage cover plate 10 is provided with a limiting pin for interacting with the limiting slot hole 11, and the top and the bottom of the anti-leakage cover plate 10 are both provided with retraction grooves 13. A first reset spring 14 is arranged inside the retraction groove 13, a limiting clamping block 15 is arranged at the top of the first reset spring 14, and a limiting clamping groove 12 for interacting with the limiting clamping block 15 is formed in the inner wall of the filtering tank 9. The top of the limiting clamping block 15 is configured to be an inclined surface structure, allowing the anti-leakage cover plate 10 to be quickly clamped and fixed.

Figure 2:
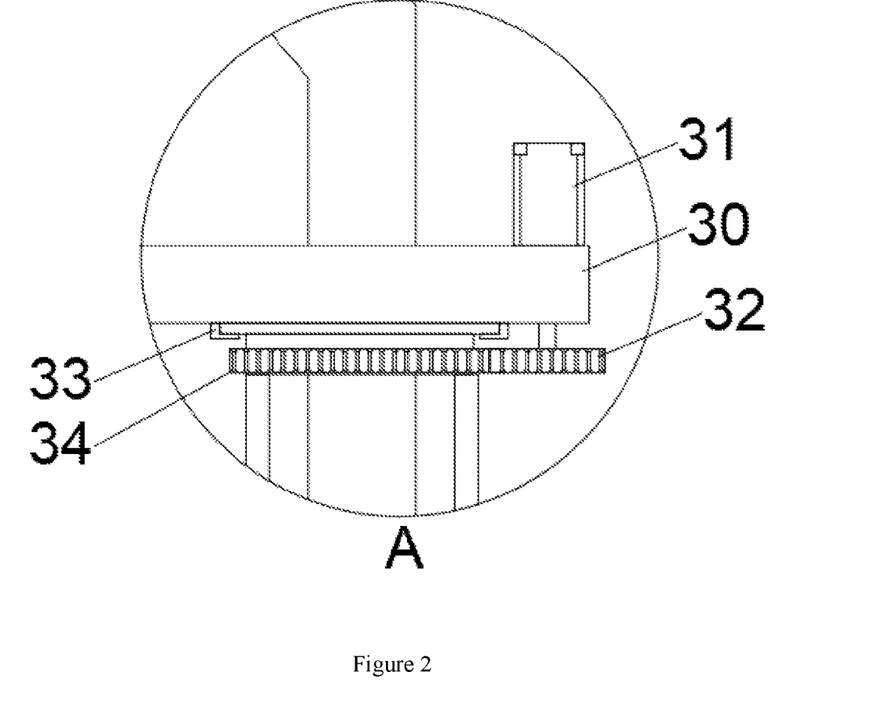
FIG. 2 is a schematic diagram illustrating an enlarged view of portion A in FIG. 1 of the present invention.

A second reset spring 30 is arranged inside the moving box body 1 and located above the oil storage tank 29, and a limiting clamping plate 33 is fixedly connected to the bottom of the second reset spring 30. A driven gear 34 is rotatably connected to the interior of the limiting clamping plate 33, a third motor 31 is fixedly connected to the top of the second reset spring 30, and a driving gear 32 is fixedly connected to an output end of the third motor 31. The driving gear 32 is engaged with the driven gear 34, the bottom of the driven gear 34 is fixedly connected to a cleaning brush 36, and the driving gear 32 propels the cleaning brush 36 to rotate through the driven gear 34. The cleaning brush 36 slowly cleans the outer side of the oil suction pipe 35, thereby preventing impurities from blocking the filtering holes in the outer side of the bottom of the oil suction pipe 35.

In a preferred embodiment of the present invention, the oil suction pipe 35 vertically extends into the oil storage tank 29, and the oil suction pipe 35 passes through the middle portion of the second reset spring 30 that is located inside the moving box body 1 and above the oil storage tank 29.

Figure 8:
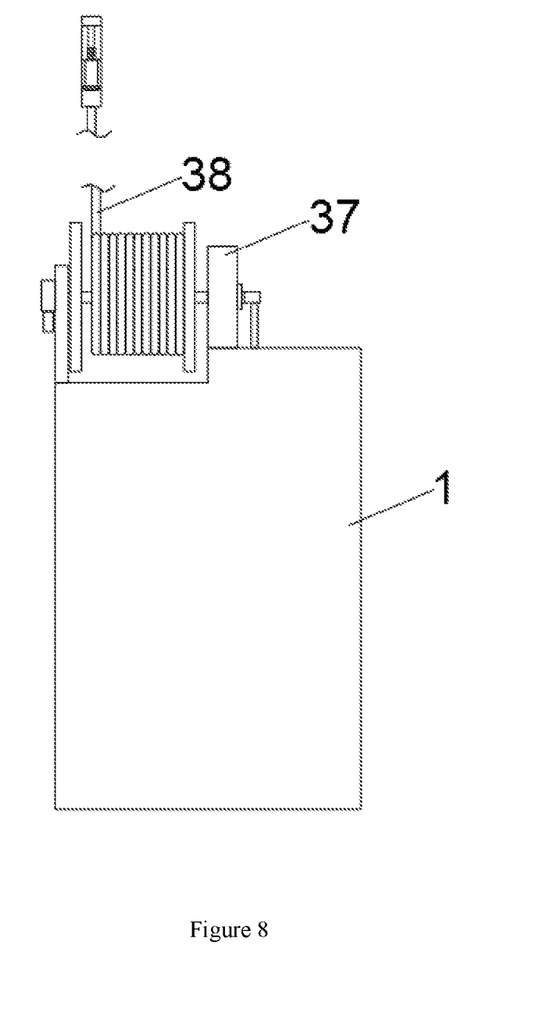
FIG. 8 is a schematic diagram illustrating a side view of the present invention.

A winding frame 37 is arranged at the top of the moving box body 1, a connecting oil pipe 38 is wound at the middle portion of the winding frame 37, and the connecting oil pipe 38 is communicated with the interior of the adjusting groove 2 through a rotating joint. Thus, a convenient winding of the connecting oil pipe 38 is facilitated.

A method for using the fan gearbox oil replacement device, comprising:

Step 1: during the gearbox oil replacement, connecting one end of the connecting oil pipe 38 to an oil discharge port of the fan gearbox first, then making the electric telescopic rod 6 to extend to push the second piston 5 and the first piston 3 to the left side, thereby enabling the second piston 5 to block the oil inlet while allowing the first piston 3 and the oil outlet to be staggered; at this point, pumping the waste oil in the fan gearbox out and discharging the waste oil into the filtering tank 9 by the sewage pump 7, thereby allowing the waste oil to enter the filtering basin 17 after being filtered by the filtering tank 9;

When the filtered impurities need to be cleaned, pulling out the filtering tank 9 from one side, and moving the limiting clamping block 15 to press the first reset spring 14, and when the limiting clamping block 15 retracts into the retraction groove 13, pulling out the anti-leakage cover plate 10 from one side, and pouring the impurities in the filtering tank 9 out; simultaneously propelling the driving lead screw 24 to rotate through the second motor 25, thus making the driving lead screw 24 propel the driving sliding block 26 to move to the second motor 25, so that the driving sliding block 26 pushes the sedimentation tank 16 leftwards out from the interior of the mobile box body 1; subsequently, removing the permanent magnet 21, cleaning the impurities off the sedimentation tank 16, and when the driving sliding block 26 approaches one side of the second motor 25, pushing the oil storage tank 29 out from the moving box body 1 by the second reset spring 30, thereby cleaning impurities off the oil storage tank 29; after the waste oil enters the filtering basin 17, propelling the anti-blocking plate 19 to rotate by the first motor 18, thus preventing the dirt in the waste oil from blocking the filtering basin 17; after the waste oil filtered by the filtering basin 17 enters the sedimentation tank 16, enabling iron impurities in the waste oil to be attached at the bottom of the sedimentation tank 16 under the action of the permanent magnet 21; after the sedimentation, when the waste oil in the oil storage tank 29 is discharged, propelling the driving gear 32 to rotate by the third motor 31 such that the driving gear 32 propels the cleaning brush 36 to rotate through the driven gear 34, which enables the cleaning brush 36 to slowly clean the outer side of the oil suction pipe 35 to prevent the impurities from blocking the filtering holes in the outer side of the oil suction pipe 35;

Step 2: after the waste oil in the fan gear box is completely discharged, connecting one end of the connecting oil pipe 38 to a high-pressure spray head, and aligning the high-pressure spray head with the fan gearbox; pulling the second piston 5 and the first piston 3 towards the other side through the retraction of the electric telescopic rod 6, thereby enabling the connecting rod 4 to block the oil outlet while allowing the second piston 5 and the oil inlet to be staggered; subsequently, pumping the filtered waste oil into the fan gearbox by means of the high-pressure oil pump 8, cleaning the fan gearbox by means of high-pressure oil, feeding fresh oil into the oil storage tank 29 after the cleaning, and then feeding the fresh oil into the fan gearbox by means of the high-pressure oil pump 8.

The parts or structures not specifically described in the present invention can merely be described using existing technologies or products, which are briefly described herein.

The above are merely preferred embodiments of the present invention, which are not intended to limit the scope of the present invention. Any equivalent structures or process modifications made using the specification of the present invention or directly or indirectly applied in other related technical fields shall equally fall into the scope of the present invention.

What is claimed:

1. A fan gearbox oil replacement device, comprising:
a moving box body, wherein a reversing mechanism, a filtering mechanism and an oil storage mechanism are arranged in an interior of the moving box body,
wherein the reversing mechanism further comprises an adjusting groove, a first piston, a connecting rod, a second piston and an electric telescopic rod; wherein the first piston and the second piston are slidably arranged within the adjustment slot, wherein the first piston and the second piston are connected through the connecting rod, wherein the electric telescopic rod is installed on an outer wall of the adjustment groove, wherein an output end of the electric telescopic rod is connected to the second piston, wherein an oil outlet is formed in a bottom of the adjusting groove and is located below the first piston, wherein an oil inlet is formed in the bottom of the adjusting groove and is located below the second piston, wherein the oil inlet and the oil outlet cannot be opened or closed at the same time, wherein the filtering mechanism further comprises a filtering tank and a sedimentation tank, wherein the filtering tank is located below the oil outlet, and the sedimentation tank is located below the filtering tank, wherein the sedimentation tank is connected to the oil storage mechanism and is communicated with an interior of the filtering tank, wherein the sedimentation tank is capable of being pushed into or pushed out from the moving box body, wherein the oil storage mechanism is capable of being pushed into or pushed out from the moving box body, and the oil storage mechanism is communicated with the oil inlet.

2. The fan gearbox oil replacement device of claim 1, wherein a fixing frame is fixedly connected to a bottom of the interior of the moving box body, wherein a limiting sliding rod is connected between the fixing frame and the inner wall of the moving box body, wherein a driving lead screw is rotatably connected between the fixing frame and an inner wall of the moving box body while located below the limiting sliding rod, wherein a second motor is fixedly connected to one side of the moving box body, wherein an output end of the second motor is connected to the driving lead screw, wherein an outer side of the driving lead screw is in threaded connection with a driving sliding block, wherein the driving sliding block is slidably connected to the limiting sliding rod, wherein top of the driving sliding block is connected to the sedimentation tank, wherein the second motor propels the driving lead screw to rotate such that the driving lead screw propels the driving sliding block to move towards the second motor, and then the driving sliding block pushes the sedimentation tank leftwards out from the interior of the moving box body, wherein a pulley is mounted on one side of the inner wall of the moving box body, and a bottom end of a driving sliding block is connected to one end of a steel wire rope, wherein another end of the steel wire rope passes through the pulley and is connected to the oil storage mechanism, and wherein a second reset spring is sleeved on an outer side of the steel wire rope and located between the oil storage mechanism and a fixing frame, wherein under the action of the second reset spring, the oil storage mechanism is pushed out from the moving box body.

3. The fan gearbox oil replacement device of claim 1, wherein the oil storage mechanism is an oil storage tank, wherein the oil storage tank is slidably connected to the interior of the moving box body, wherein an oil suction pipe communicating with the oil inlet is arranged in the oil storage tank, wherein the second reset spring is arranged in the moving box body and located above the oil storage tank, wherein a limiting clamping plate is fixedly connected to the bottom of the second reset spring, wherein a driven gear is rotatably connected to the interior of the limiting clamping plate, wherein a third motor is fixedly connected to top of the second reset spring, wherein a driving gear is fixedly connected to an output end of the third motor, wherein the driving gear is engaged with the driven gear, wherein bottom of the driven gear is fixedly connected to a cleaning brush, wherein the cleaning brush is located inside the oil storage tank and outside the oil suction pipe, wherein the driving gear propels the cleaning brush to rotate through the driven gear, and wherein the cleaning brush cleans the outer side of the oil suction pipe, thereby preventing impurities from blocking the filtering holes in the outer side of the bottom of the oil suction pipe.

4. The fan gearbox oil replacement device of claim 1, wherein the adjusting groove is arranged at top of the interior of the moving box body, wherein a sewage pump and a high-pressure oil pump are fixedly connected to the interior of the moving box body and are located below the adjusting groove, wherein the filtering tank is mounted inside the moving box body 1 and is located below the sewage pump.

5. The fan gearbox oil replacement device of claim 1, wherein top of the filtering tank is provided with an inlet, wherein the oil outlet is arranged above the inlet, wherein a bottom portion of the filtering tank is provided with filtering holes, wherein one end of the filtering tank is clamped with an anti-leakage cover plate, wherein another end of the filtering tank is provided with a limiting slot hole, wherein one side of the anti-leakage cover plate is provided with a limiting pin for interacting with the limiting slot hole, wherein top and bottom of the anti-leakage cover plate are each provided with retraction grooves, wherein a first reset spring is arranged inside the retraction groove, wherein a limiting clamping block is arranged at top of the first reset spring, wherein a limiting clamping groove for interacting with the limiting clamping block is formed in the inner wall of the filtering tank, wherein the top of the limiting clamping block is configured to be an inclined surface structure, allowing the anti-leakage cover plate to be quickly clamped and fixed.

6. The fan gearbox oil replacement device of claim 1, wherein a filtering basin is mounted at top of the sedimentation tank, wherein the first motor is arranged at bottom of the filtering basin, wherein an output end of the first motor is connected to an anti-blocking plate, wherein the bottom of the anti-blocking plate is slidably connected to the filtering basin, wherein bottom of the sedimentation tank is provided with an inclined groove, and wherein a permanent magnet is mounted in the inclined groove.

7. The fan gearbox oil replacement device of claim 1, wherein a winding frame is arranged at top of the moving box body, wherein a connecting oil pipe is wound at a middle portion of the winding frame, and wherein the connecting oil pipe is communicated with an interior of the adjusting groove through a rotating joint.

8. A method for using the fan gearbox oil replacement device of claim 1, comprising:

step 1: during gearbox oil replacement, connecting one end of the connecting oil pipe to an oil discharge port of the fan gearbox, making the electric telescopic rod to extend to push the second piston and the first piston to the left side, thereby enabling the second piston to block the oil inlet while allowing the first piston and the oil outlet to be staggered; pumping waste oil in the fan gearbox out and discharging the waste oil into the filtering tank by the sewage pump, thereby allowing the waste oil to enter the filtering basin and the sedimentation tank after being filtered by the filtering tank; after the waste oil enters the filtering basin, propelling the anti-blocking plate to rotate by the first motor, thus preventing the dirt in the waste oil from blocking the filtering basin; after the waste oil filtered by the filtering basin enters the sedimentation tank, enabling iron impurities in the waste oil to be attached at the bottom of the sedimentation tank under the action of the permanent magnet; after the sedimentation, when the waste oil in the oil storage tank is discharged, propelling the driving gear to rotate by the third motor such that the driving gear propels the cleaning brush to rotate through the driven gear, which enables the cleaning brush to slowly clean the outer side of the oil suction pipe to prevent the impurities from blocking the filtering holes in the outer side of the oil suction pipe;

when the filtered impurities need to be cleaned, pulling out the filtering tank from the moving box body, and moving the limiting clamping block to press the first reset spring, and when the limiting clamping block retracts into the retraction groove, pulling out the anti-leakage cover plate from one side, and pouring the impurities in the filtering tank out; simultaneously propelling the driving lead screw to rotate through the second motor, thus making the driving lead screw propel the driving sliding block to move to the second motor, so that the driving sliding block pushes the sedimentation tank leftwards out from the interior of the mobile box body; removing the permanent magnet, cleaning the impurities off the sedimentation tank, and when the driving sliding block approaches one side of the second motor, pushing the oil storage tank out from the moving box body by the second reset spring, thereby cleaning impurities off the oil storage tank;

step 2: after the waste oil in the fan gear box is completely discharged, connecting one end of the connecting oil pipe to a high-pressure spray head, and aligning the high-pressure spray head with the fan gearbox; pulling the second piston and the first piston towards the other side through the retraction of the electric telescopic rod, thereby enabling the connecting rod to block the oil outlet while allowing the second piston and the oil inlet to be staggered; subsequently, pumping the filtered waste oil into the fan gearbox by means of the high-pressure oil pump, cleaning the fan gearbox by means of high-pressure oil, feeding fresh oil into the oil storage tank after the cleaning, and then feeding the fresh oil into the fan gearbox by means of the high-pressure oil pump.

\* \* \* \* \*